United States Patent [19]
Kabayama

[11] 3,959,443
[45] May 25, 1976

[54] METHOD OF SYNTHESIZING CUBIC CRYSTAL STRUCTURE BORON NITRIDE

[75] Inventor: Takahiko Kabayama, Hiratsuka, Japan

[73] Assignee: Kabushiki Kaisha Komatsu Seisakusho, Tokyo, Japan

[22] Filed: Mar. 26, 1974

[21] Appl. No.: 455,009

[30] Foreign Application Priority Data
Mar. 26, 1973  Japan................................ 48-33486
Aug. 22, 1973  Japan................................ 48-93291

[52] U.S. Cl. ............................................. 423/290
[51] Int. Cl.² ........................................ C01B 35/08
[58] Field of Search ............... 423/290, 446; 264/84

[56] References Cited
UNITED STATES PATENTS

| | | | |
|---|---|---|---|
| 3,142,595 | 7/1964 | Wentorf............................. | 423/290 |
| 3,401,019 | 9/1968 | Cowan et al....................... | 423/446 |
| 3,536,447 | 10/1970 | Wakatsuki et al................. | 423/446 |
| 3,667,911 | 6/1972 | Balchan et al.................... | 423/290 X |

FOREIGN PATENTS OR APPLICATIONS 1,131,645   6/1962   Germany .......................... 423/290

OTHER PUBLICATIONS

"Chemical Abstracts"; Vol. 78, 1973; p. 142, 99888r.

Primary Examiner—G. O. Peters
Attorney, Agent, or Firm—Armstrong, Nikaido & Wegner

[57] ABSTRACT

A method of synthesizing cubic crystal structure boron nitride from hexagonal crystal structure boron nitride or other boron compound by subjecting the boron nitride or boron compound to a pressure of at least about 35,000 atmospheres and a temperature of at least about 1,000°C in the presence of, as a catalyst, silicon, silicon nitride, a preformed silicon alloy or nitride thereof, or a silicon-and-aluminum-containing mixture.

11 Claims, No Drawings

METHOD OF SYNTHESIZING CUBIC CRYSTAL STRUCTURE BORON NITRIDE

BACKGROUND OF THE INVENTION

This invention relates to a method of synthesizing cubic crystal structure boron nitride, and more particularly, to a method of synthesizing cubic crystal structure boron nitride by subjecting a mixture of a hexagonal boron nitride or other boron compound and a catalyst to a high temperature and a high pressure, which method is characterized by the use, as the catalyst, of silicon, silicon nitride, a silicon alloy mixture or nitride thereof or a silicon-and-aluminum containing mixture.

In a prior method of synthesizing cubic boron nitride, which is described for example in U.S. Pat. No. 2,947,617, hexagonal boron nitride and a catalyst are exposed to high pressures, above 40,000 atmospheres, and elevated temperature, above 1,200°C. In this process catalysts are employed which include alkali metals, alkaline-earth metals, antimony, tin, and lead. Certain of these catalysts are unstable and may be easily oxidized, however, and it is not easy, therefore, to control the process.

Another method for synthesizing cubic boron nitride employs lower pressures and lower temperatures and alloys of silver and cadmium as catalyst.

In this latter method, the cubic boron nitride may be synthesized at lower pressures of about 30,000 atmospheres and at lower temperatures, under 1,000°C, but the conversion ratio from hexagonal to cubic boron nitride is so low that the maximum yield is only 20%. Accordingly this method is not economical for the production of cubic boron nitride. It is, therefore, an object of the present invention to provide a method which will avoid the above mentioned problems and efficiently produce cubic boron nitride employing a catalyst which is stable and easy to handle.

SUMMARY OF THE INVENTION

The object of the present invention is accomplished by using as the new catalyst: silicon, silicon nitride, a preformed silicon alloy or nitride thereof or a silicon-and-aluminum-containing mixture which catalysts, heretofore, have not been used for synthesizing cubic boron nitride.

DETAILED DESCRIPTION OF THE INVENTION

The terminology cubic crystal structure boron nitride and hexagonal boron nitride employed herein are art-recognized terms as exemplified, for example, by U.S. Pat. No. 2,947,617, discussed above.

In the catalysis, in order to expose the hexagonal boron nitride or boron compound to as much catalyst surface as possible, the catalyst is preferably used in a finely divided, or powder, form.

As the preformed silicon alloy, alloys of silicon and aluminum, silicon and copper, silicon and manganese, silicon and titanium and silicon and zirconium may be used. Alloy compositions of silicon to the other metal in the ratio, in atomic percent, of 70:30 and 50:50 have been used with good results.

The silicon-and-aluminum-containing mixtures, which may be employed as the catalyst, include mixtures of finely divided elemental silicon and finely divided elemental aluminum, aluminum alloys, aluminum nitride and aluminum boride.

In addition to hexagonal boron nitride other boron compounds including elemental boron may be used as the starting materials. Best results, however, appear to be obtained with hexagonal boron nitride.

Weight ratios of hexagonal boron nitride or boron compound to catalyst of 4:1, 3:1 and 1:1 have advantageously been employed.

When a boron compound other than hexagonal boron nitride is employed as the starting material, a nitride containing catalyst is used. For example, cubic boron nitride may be obtained from elemental boron and as the catalyst, silicon nitride.

The hexagonal boron nitride or other boron compound and catalyst are subjected to the elevated pressure and temperature for a period of from about 5 to about 20 minutes depending on the progress of the conversion. Longer time periods are of course economically undesirable and do not appreciably affect the resultant yield ratio.

Further details of the mechanics of the conversion process and procedure may be obtained by referring to the teachings of U.S. Pat. No. 2,947,617, the pertinent portions of which are incorporated herein by reference.

According to the invention, the cubic boron nitride is synthesized by subjecting the mixtures of the hexagonal boron nitride or boron compound and catalyst to elevated pressures above about 35,000 atmospheres and elevated temperatures above about 1,000°C and, in a preferred embodiment, to pressures above about 45,000 atmospheres and a temperature above about 1,500°C. In this process it is easy to obtain a yield ratio as high as 60% at a pressure of about 52,000 atmospheres and at a temperature of about 1,700°C. The quality of the cubic boron nitride synthesized by this method is superior, and the method therefrom may be employed as an industrial method of producing cubic boron nitride very economically.

The mechanism of synthesis of cubic boron nitride in this process is not clear, but it is postulated that hexagonal boron nitride or boron compound and catalyst metal interact at the elevated pressure and elevated temperature to form a complex of hexagonal boron nitride and catalyst metal nitride.

This complex acts as a molten solvent which dissolves residual hexagonal boron nitride converting it to cubic boron nitride which precipitates. Silicon apparently functions as a catalyst for the formation of the complex and it is desirable, therefore, for silicon to be present in the catalyst in at least about 10% by weight.

The variables in the process are such that the finer the catalyst powder, the lower is the necessary pressure in the method and the higher is the yield ratio at the same synthesis conditions.

To identify the cubic boron nitrides, they were separated by means of chemical extraction, and then were investigated by X-ray diffraction analysis, hardness test and observation by the optical microscope and the scanning electron beam microscope. In the process of the extraction, the catalyst metals in the compressed materials were dissolved in aqua regia, remaining hexagonal boron nitrides were dissolved in a solution of sodium fluoride and sulfuric acid and cubic boron nitrides were separated from the residue by means of specific gravity separation.

The temperature inside the pressure cell was measured by means of a platinum-platinum rhodium thermocouple and a temperature calibration under high pressure was made. The pressure generated inside the cell was calibrated making reference to the electrical resistance transitions in bismuth, thallium and barium at room temperature. To make a more correct pressure calibration inside the cell at the high temperature, the verified equilibrium line between cubic boron nitride and hexagonal boron nitride on the pressure-temperature diagram was used. The following examples illustrate the practice of this invention.

EXAMPLE 1

Silicon powder (99.99% in purity) of less than 5 microns in diameter was used as catalyst. A mixture of the silicon powder and hexagonal boron nitride in a weight ratio of 1 : 4 was subjected to a pressure of 60,000 atmospheres and a temperature of 1,800°C for ten minutes. The resulting yield of the cubic boron nitride was 2%. The maximum size of cubic boron nitride formed was about 100 microns and crystals were octahedral.

EXAMPLE 2

A powder of an alloy of silicon and aluminum (in the ratio 70 : 30 in atomic percent) was used as catalyst, and a mixture of the catalyst and hexagonal boron nitride in the weight ratio of 1 : 4 was subjected to the same pressure and temperature as Example 1. The resulting yield of the cubic boron nitride was about 60%.

EXAMPLE 3

A mixture of the same composition as that of Example 2 was subjected to pressure of 42,000 atmospheres and a temperature of 1,300°C for ten minutes. A small amount of cubic boron nitride was separated.

EXAMPLE 4

A powder of an alloy of silicon and copper (in the ratio 70 : 30 in atomic percent) was used as catalyst. A mixture of the catalyst and hexagonal boron nitride in the weight ratio 1 : 4 was subjected to the same pressure and temperature as in Example 1, and the resulting yield of the cubic boron nitride was about 5%.

EXAMPLE 5

A powder of an alloy of silicon and manganese (in the ratio 50 : 50 in atomic percent) was used as catalyst in the place of the alloy of Example 4. The reaction was carried out under the same conditions as that of Example 4, and a small amount of cubic boron nitride was formed.

EXAMPLE 6

A powder of an alloy of silicon and titanium (in the ratio 70 : 30 in the atomic percent) was used as catalyst. The mixture of catalyst and hexagonal boron nitride was held under the same conditions as that of Example 4, and the resulting yield was about 2%.

EXAMPLE 7

A mixture of hexagonal boron nitride and silicon nitride in the weight ratio 4 : 1 was subjected to the same pressure and temperature as in Example 4, and a small amount of cubic boron nitride was formed.

EXAMPLE 8

A mixture of boron powder and silicon nitride in the weight ratio 5 : 5 was subjected to the same pressure and temperature as in Example 4, and a small amount of cubic born nitride was formed.

EXAMPLE 9

A mixture of a finely divided silicon and a finely divided aluminum in a weight ratio of 1 : 1 was employed as a catalyst. The mixed catalyst system was mixed with hexagonal boron nitride in a weight ratio of 1 : 3 and the mixture was subjected to a pressure of 60,000 atmospheres and a temperature of 1,800°C for 10 minutes to obtain cubic crystal structure boron nitride in a yield of about 60%.

EXAMPLE 10

A mixture of a finely divided silicon and a finely divided aluminum nitride in a weight ratio of 2 : 1 was employed as a catalyst and a mixture of the catalyst and hexagonal boron nitride in a weight ratio of 1 : 3 was maintained for 10 minutes under a high pressure and high temperature condition of 55,000 atmospheres and 1,750°C to obtain cubic crystal structure boron nitride in a yield of about 50%.

EXAMPLE 11

A mixture (of a catalyst and hexagonal boron nitride) of the same composition as in Example 9 was subjected to a pressure of 45,000 atmospheres and a temperature of 1,500°C for 10 minutes to obtain cubic crystal structure boron nitride.

EXAMPLE 12

A mixture of a finely divided silicon and a finely divided aluminum in a weight ratio of 1 : 1 was employed as a catalyst and a mixture of the catalyst and hexagonal boron nitride in a weight ratio of 1 : 3 was subjected to a pressure of 38,000 atmospheres and a temperature of 1,000°C to obtain a small amount of cubic crystal structure boron nitride.

EXAMPLE 13

A mixture of a finely divided silicon and a finely divided aluminum alloy in a weight ratio of 1 : 1 was employed as a catalyst and a mixture of the catalyst and hexagonal crystal structure boron nitride in the weight ratio of 1 : 3 was maintained under a high pressure and high temperature condition of 60,000 atmospheres and 1,750°C for 10 minutes to obtain cubic crystal structure boron nitride in a yield of about 50%.

EXAMPLE 14

A mixture of a finely divided aluminum boride and a finely divided silicon in a weight ratio of 1 : 1 was employed as a catalyst and a mixture of the catalyst and hexagonal boron nitride in a weight ratio of 1 : 3 was maintained under a high temperature and high pressure condition of 60,000 atmospheres and 1,750°C for 10 minutes to obtain cubic crystal structure boron nitride in a yield of about 50%.

EXAMPLE 15

A catalyst-hexagonal boron nitride mixture of the same composition as in Example 9 was subjected to a pressure of 45,000 atmospheres and a temperature of 1,300°C for 10 minutes to obtain cubic crystal structure boron nitride.

EXAMPLE 16

A mixture of a finely divided aluminum boride and a finely divided silicon in a weight ratio of 1 : 3 was employed as a catalyst and a mixture of the catalyst and hexagonal boron nitride in a weight ratio of 1 : 4 was subjected to a pressure of 60,000 atmospheres and a temperature of 1,800°C for 10 minutes to obtain cubic crystal structure boron nitride in a yield of about 60%.

The cubic boron nitride produced according to the invention may be used in a number of applications where high abrasion is required including, for example, grinding wheels. Other uses will be apparent to those skilled in the art.

Although the invention has been described in conjunction with a number of preferred embodiments, it is not to be limited thereto, but is intended to include all alternatives and embodiments within the scope and spirit of the appended claims.

What is claimed is:

1. A method of synthesizing cubic crystal structure boron nitride comprising subjecting a mixture of a hexagonal boron nitride or a boron compound and a catalyst to a pressure of at least 35,000 atmospheres and a temperature of at least about 1,000°C, wherein said catalyst is a silicon and aluminum-containing material selected from the group consisting of a silicon-aluminum alloy, a mixture of silicon and aluminum alloy, a mixture of silicon and aluminum, a mixture of silicon and aluminum nitride and a mixture of silicon and aluminum boride.

2. The method of claim 1 in which the mixture of said catalyst and hexagonal boron nitride is in a ratio of about 1 : 1 to 1 : 20 by weight.

3. The method of claim 1 in which the mixture of said catalyst and hexagonal boron nitride is subjected to a pressure of at least 45,000 atmospheres and a temperature of at least 1,500°C.

4. The method of claim 3 in which the catalyst is an alloy of silicon and aluminum.

5. The method of claim 1 in which the catalyst is a mixture of silicon and aluminum.

6. The method of claim 1 in which the catalyst is a mixture of silicon and an aluminum alloy.

7. The method of claim 1 in which the catalyst is a mixture of silicon and aluminum nitride.

8. The method of claim 1 in which the catalyst is a mixture of silicon and aluminum boride.

9. The method of claim 1 in which the reaction pressure is at least about 45,000 atmospheres and the temperature at least about 1,500°C.

10. The method of claim 9 in which the ratio of catalyst and hexagonal boron nitride reaction mixture is about 1 : 1 to 1 : 10 by weight.

11. The method of claim 1 in which the catalyst mixture comprises at least 10% by weight of silicon.

* * * * *